Sept. 14, 1954   A. J. COSMETTO   2,688,858
GOBLET COASTER
Filed March 11, 1953
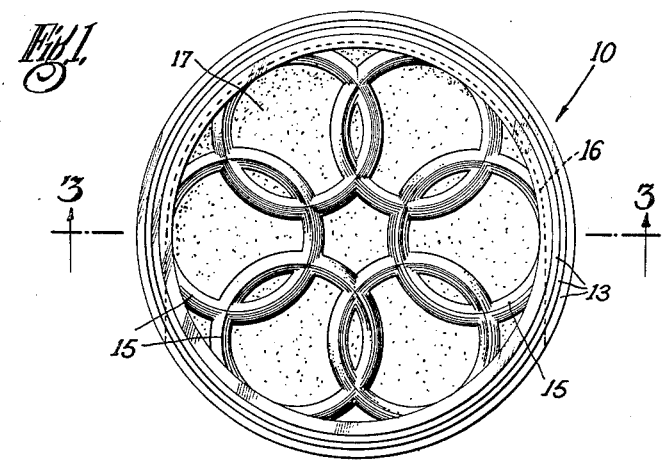
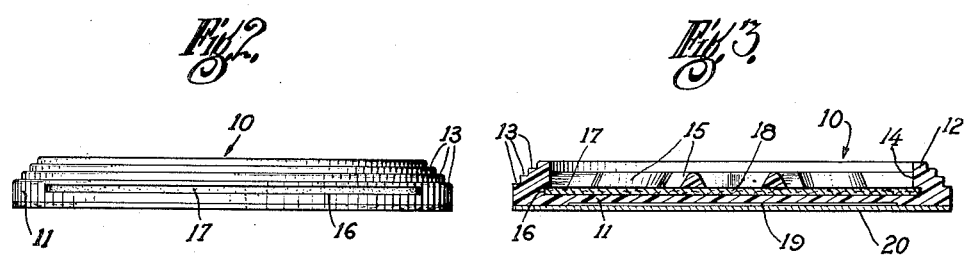
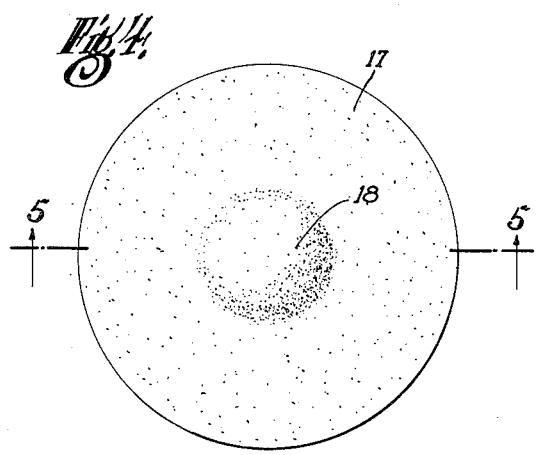
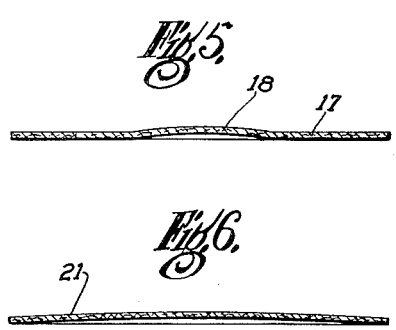
INVENTOR.
Aristodéme J. Cosmetto
BY
Moses, Nolte, Crews & Berry
ATTORNEYS Patented Sept. 14, 1954

2,688,858

UNITED STATES PATENT OFFICE 2,688,858

GOBLET COASTER

Aristodeme J. Cosmetto, Rye, N. Y.

Application March 11, 1953, Serial No. 341,786

4 Claims. (Cl. 65—53)

This invention relates to coasters.

It is an object of the present invention to provide a coaster for drinking glasses which will not only protect the surface on which the coaster is placed but will also absorb liquid and condensing moisture on the outside of the glass.

It is another object of the present invention to provide a coaster of the above type which is formed from a unitary piece of plastic and which releasably receives a circular blotter, a blotter being spaced from but having access to the bottom of the glass through a grill provided at the top of the coaster.

Other objects of the present invention are to provide a coaster of the above type which is of simplified construction, inexpensive to manufacture, has a minimum number of parts, and which is efficient in use.

For other objects and a better understanding of the present invention, reference may be had to the following detailed description taken in connection with the accompanying drawing:

Figure 1 is a top plan view of a coaster embodying the features of the present invention;

Fig. 2 is a side elevational view thereof;

Fig. 3 is a vertical sectional view taken along the line 3—3 of Fig. 1;

Fig. 4 is a top plan view of the blotter forming a part of the present invention;

Fig. 5 is a vertical sectional view taken along the line 5—5 of Fig. 4 and

Fig. 6 is a view similar to Fig. 5, but showing a modified from of blotter.

Referring now more in detail to the drawing, in which similar reference numerals identify corresponding parts throughout the several views, there is shown a coaster, referred to collectively as 10, and including a flat circular base 11 of plastic or other suitable material, substantially as illustrated.

The base 11 around its periphery is integrally formed with an upwardly extending side wall 12, the outer surface of side wall 12 being graduated above the base 11 in steps 13 for ornamental effect.

Thus, the inner surface of side wall 12 presents a circular opening 14 adapted to receive the bottom of a drinking glass.

A grill 15 is integrally formed in the inner surface of side wall 12, substantially as illustrated in Figs. 1 and 3, the top of grill 15 terminating below the top of central opening 14 whereby to permit the bottom of the drinking glass to be received within the opening 14 and to rest on the grill 15.

The bottom of grill 15 is freely spaced from the top of base 11 by means of a slot 16, this slot communicating with the periphery of base 11 and extending around the periphery of grill 15, as shown in Figs. 1 through 3.

A circular blotter 17 having a raised central portion 18 slides in between the grill 15 and the base 11 within the slot 16, substantially as illustrated in Figs. 1 through 3. The blotter will be retained within the slot 16 by the resilience of central portion 18, which is compressed by the grill, as will be obvious.

The bottom surface of base 11 is provided with a circular groove 19 across which is secured in suitable manner a circular felt base 20.

In use, the coaster 10 is placed upon supporting surface to be protected and the drinking glass received within the opening 14 and resting on the grill 15. Liquid on the outside of the glass and condensing moisture will run to the bottom of the glass and it will be absorbed by blotter 18 through grill 15. This will also prevent the bottom of the glass from adhering to the top of the coaster, as occurs with coasters now in use. This objectionable adhesion is caused by a film of liquid on the bottom of the glass and the top of the coaster, and results in the coaster being raised along with the glass to later drop off when least expected.

When the blotter 17 has become saturated with liquid, it may be readily removed by pushing it outwardly from the fingers through grill 15 and replaced by a fresh blotter. Also varying colors may be used when it is desired. It will be noted that a glass is prevented from lateral displacement off of the grill 15 by the side wall 12, thus insuring contact between the bottom of the glass and the grill at all times to permit absorption of liquid by the blotter.

It will be noted that the coaster proper can be formed of plastic in a single molding operation and that a relatively low cost to the manufacturer and ultimately to the consumer results.

Referring now particularly to Fig. 6 there is shown a modified form of circular blotter 21 adapted to be inserted into the slot 16 in a manner similar to the blotter 17. It will be noted that the blotter 21 is convexly curved and will be retained within the slot 16 by compression to the flat position by grill 15. With the blotter 21, the frictional contact between the grill 15 on its top surface and the base 11 on its bottom surface is distributed over the entire area of blotter.

It should now be apparent that there has been provided a coaster which protects the supporting surface from wet drinking glasses, but which also absorbs liquid and condensed moisture from the glass itself. It should also be apparent that there has been provided a coaster of the above type which includes means for preventing the lateral displacement of the glass from the coaster supporting surface, and which by the absorption of liquid from the bottom of the glass prevents adhesion between the coaster and the bottom of said glass.

It should also be apparent that there has been provided a coaster of the above type wherein the moisture absorbing means is easily and readily removed for replacement when it becomes saturated with liquid, while at the same time being firmly retained within the coaster when in use.

While various changes may be made in the detail construction, it shall be understood that such changes shall be within the spirit and scope of the present invention as defined by the appended claims.

I claim:

1. A coaster for drinking glasses comprising a substantially circular flat base, an upwardly extending side wall around the periphery of said base, the interior surface of said side wall presenting a substantially circular opening adapted to receive the bottom of a drinking glass, a flat grill interlaced across the interior of said side wall below the top thereof, a flat slit intermediate said grill and the top of said base, said slit communicating with the exterior of said base at one side thereof and extending around the periphery of said grill, and a substantially circular blotter disposed within said slit intermediate said grill and the top of said base whereby to absorb liquid from the bottom of a drinking glass resting on the top of said grill within said side wall.

2. A coaster, according to claim 1, said blotter having a convex central portion adapted to be compressed by said grill whereby to resiliently retain said blotter within said slot.

3. A coaster for drinking glasses, according to claim 1, said blotter being convex and adapted to be compressed by said grill across its entire surface.

4. A coaster for drinking glasses comprising a substantially flat base, an upwardly extending side wall around the periphery of said base, the interior surface of said wall presenting an opening adapted to receive the bottom of a drinking glass, a flat grill interlaced across the interior of said side wall below the top thereof, a flat slit intermediate said grill and the top of said base, said slit communicating with the exterior of said base at one side thereof and extending around the periphery of said grill, and a blotter disposed within said slit intermediate said grill and the top of said base.

References Cited in the file of this patent

UNITED STATES PATENTS

| Number | Name | Date |
| --- | --- | --- |
| 169,188 | Novinsky | Oct. 26, 1875 |
| 482,603 | Weigel | Sept. 13, 1892 |
| 536,353 | Kickhefel | Mar. 26, 1895 |
| 1,862,533 | Fish, Jr. | June 14, 1932 |
| 2,118,326 | Richardson, Jr. | May 24, 1938 |
| 2,496,157 | Gaudino | Jan. 31, 1950 |

FOREIGN PATENTS

| Number | Country | Date |
| --- | --- | --- |
| 74,581 | Germany | Apr. 18, 1894 |
| 18,899 | Switzerland | Sept. 29, 1899 |